United States Patent
Hemphill et al.

(10) Patent No.: US 10,494,036 B2
(45) Date of Patent: *Dec. 3, 2019

(54) TAILGATE WORK SURFACE

(71) Applicant: Ford Global Technologies, LLC, Dearborn, MI (US)

(72) Inventors: Joshua Robert Hemphill, White Lake, MI (US); Jack Marchlewski, Saline, MI (US); Robert Reiners, Grosse Ile, MI (US); Dragan B. Stojkovic, Taylor, MI (US); Colleen Marie Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,866

(22) Filed: Sep. 18, 2017

(65) Prior Publication Data

US 2018/0208252 A1    Jul. 26, 2018

Related U.S. Application Data

(63) Continuation of application No. 15/412,381, filed on Jan. 23, 2017, now Pat. No. 9,796,429.

(51) Int. Cl.
*B62D 33/02* (2006.01)
*B62D 33/023* (2006.01)
*F16B 5/02* (2006.01)
*B62D 33/027* (2006.01)

(52) U.S. Cl.
CPC ....... *B62D 33/023* (2013.01); *B62D 33/0273* (2013.01); *F16B 5/02* (2013.01)

(58) Field of Classification Search
CPC ................................ B62D 33/023; F16B 5/02
USPC ................................................ 296/39.2, 57.1
See application file for complete search history.

(56) References Cited

U.S. PATENT DOCUMENTS

| 4,023,850 | A | | 5/1977 | Tillery |
| 4,472,639 | A | | 9/1984 | Bianchi |
| 4,707,016 | A | | 11/1987 | McDonald |
| 5,000,503 | A | | 3/1991 | Bernatek |
| 5,372,397 | A | * | 12/1994 | Arndt ...................... B60R 13/01 |
| | | | | 296/39.2 |
| 5,887,931 | A | | 3/1999 | Bills et al. |
| 6,206,445 | B1 | | 3/2001 | Brooks |
| 6,283,527 | B1 | * | 9/2001 | Desmarais ................ B60P 1/00 |
| | | | | 280/759 |
| 7,354,090 | B1 | | 4/2008 | Pomorski |
| 2002/0149223 | A1 | * | 10/2002 | Saucier .................. B62D 33/02 |
| | | | | 296/39.2 |
| 2016/0194035 | A1 | * | 7/2016 | Lu ....................... B62D 25/2072 |
| | | | | 296/39.2 |

(Continued)

*Primary Examiner* — Joseph D. Pape
(74) *Attorney, Agent, or Firm* — Vichit Chea; Brooks Kushman, P.C.

(57) ABSTRACT

A tailgate cover assembly may include a first panel having a beaded side and a flat side, and a first ledge extending from one end of the first panel, and a second panel having a beaded side and a flat side, and a second ledge extending from an end proximate to the first panel, the second ledge configured to overlap the first ledge to attach the first panel to the second panel wherein the flat side of the first panel aligns with the flat side of the second panel to form a tailgate cover having a beaded side and a flat side.

16 Claims, 2 Drawing Sheets

(56) References Cited

U.S. PATENT DOCUMENTS

2016/0236724 A1  8/2016  Borges Filho et al.

* cited by examiner

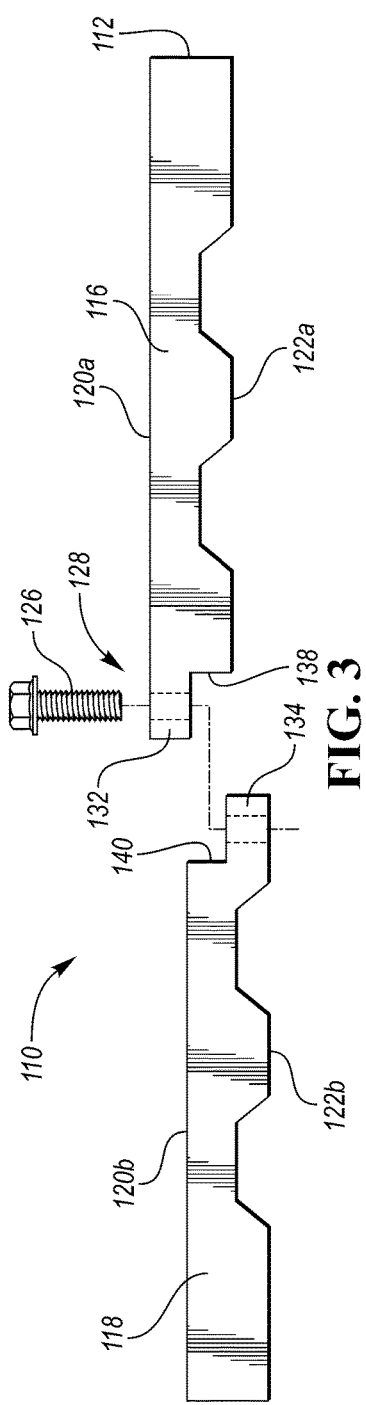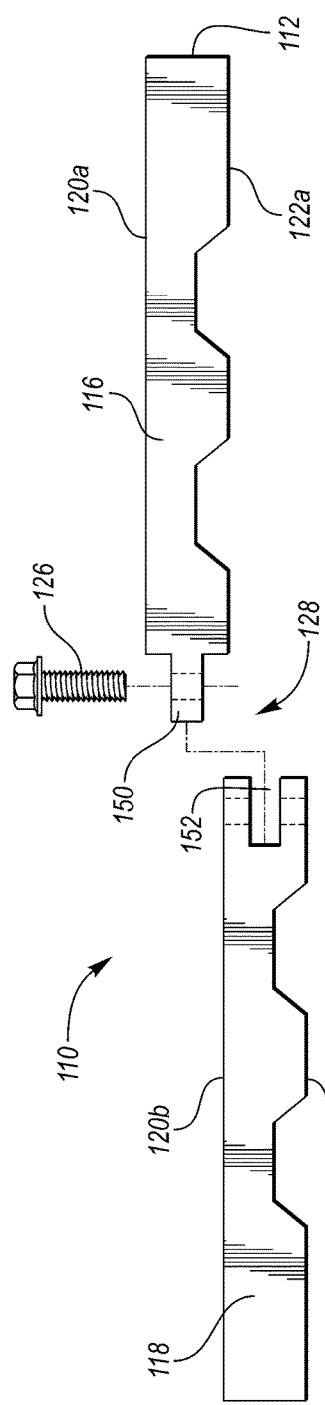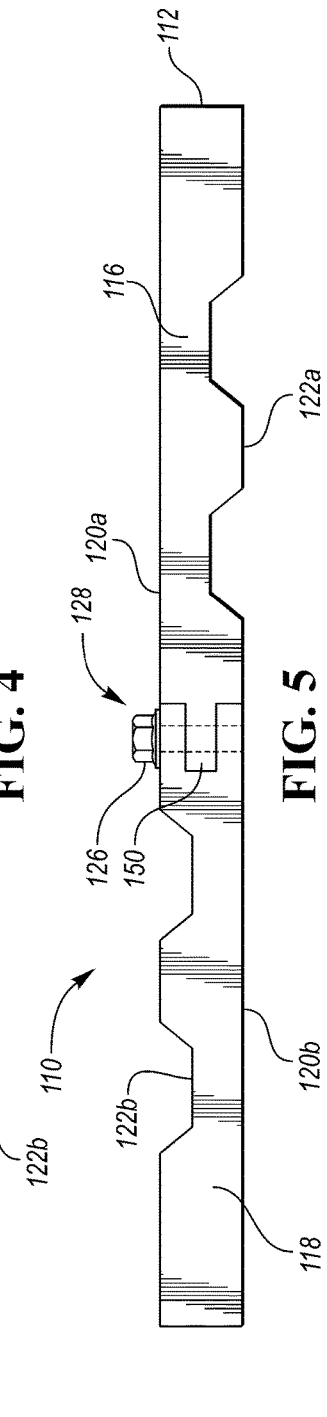

TAILGATE WORK SURFACE

CROSS-REFERENCE TO RELATED APPLICATIONS

This application is a continuation of U.S. application Ser. No. 15/412,381 filed Jan. 23, 2017, now U.S. Pat. No. 9,796,429, issued on Oct. 24, 2017, the disclosure of which is hereby incorporated in its entirety by reference herein.

TECHNICAL FIELD

The technical field of this disclosure relates to tailgate work surfaces.

BACKGROUND

Pickup trucks include tailgate doors are movable between open and closed positions. Tailgates are used for various purposes, especially when tailgate doors are open. Owners may wish to place items, or otherwise use the tailgate door, as a table or countertop. Due to the manufacturing constraints and strength and stiffness requirements, the interior side of tailgate doors, as well as the bed of the truck, often include an uneven surface, preventing the use of the interior side for tailgating, worksites, etc.

SUMMARY

A tailgate cover assembly may include a first panel having a beaded side and a flat side, and a first ledge extending from one end of the first panel, and a second panel having a beaded side and a flat side, and a second ledge extending from an end proximate to the first panel, the second ledge configured to overlap the first ledge to attach the first panel to the second panel wherein the flat side of the first panel aligns with the flat side of the second panel to form a tailgate cover having a beaded side and a flat side.

A tailgate assembly may include a tailgate cover including a first panel and a second panel, wherein each of the first and second panels have a beaded side and a flat side, the first panel including a projection and the second panel defining a groove configured to receive the projection to attach the first panel to the second panel.

A tailgate cover assembly may include a first panel having a beaded side and a flat side, and a first ledge extending from one end of the first panel, a second panel having a beaded side and a flat side, and an attachment mechanism configured to selectively attach the first panel to the second panel to form a tailgate cover wherein the cover forms one of a cover having a beaded side and a flat side, or a cover having partially beaded and partially flat sides.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 3 illustrates a side view of the tailgate cover with an attachment mechanism;

FIG. 4 illustrates a side view of the tailgate cover 110 with another attachment mechanism; and FIG. 5 illustrates a side view of the tailgate cover with the panels in an attached state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a tailgate assembly including a tailgate cover that selectively attaches to the tailgate door of a vehicle. The cover may include a pair of panels that are attachable to one another, each having a beaded side and a flat side. Depending on the user's desire at a given moment, the cover may be customized to expose a flat surface, a beaded surface, or a combination of the two. The cover may be detached from the tailgate, flipped, and configured to the desired surface, then reattached for use. The panels may detach from one other and be reoriented such that when the panels are attached, they either form a cohesive surface forming a single type of surface (e.g., a flat surface on one side and a beaded surface on the other), or a partially beaded and flat combination surface. The cover may then be attached to the tailgate to expose either the flat surface, the beaded surface, or the combination surface. Thus, one of three surface types may be selected and configured.

Figure 1:
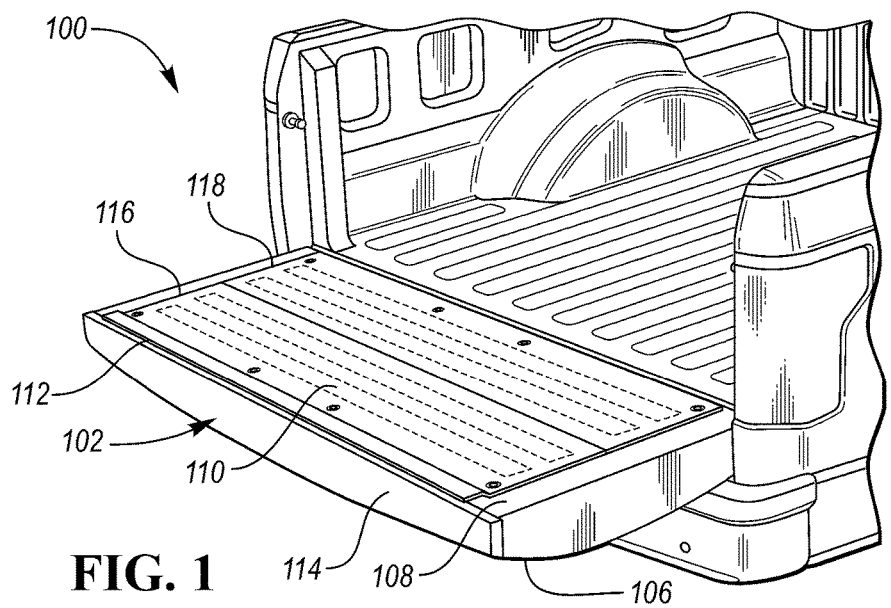
FIG. 1 illustrates an example tailgate assembly with tailgate cover.

FIG. 1 illustrates an example tailgate assembly 100. The tailgate assembly 100 may include a tailgate door 102 including a tailgate body panel 106 and an inner portion 108 of the tailgate assembly 100. The inner portion 108 may be covered by a tailgate cover 110. The tailgate cover 110 may provide rigidity to the tailgate assembly 100 and may include various recesses, protrusions, and provide a generally uneven surface. When the tailgate assembly 100 is in an open state, as shown in FIG. 1, owners, user, drivers, etc., may desire a smooth, flat, surface (as shown in FIG. 1) to place items. However, at other times, owners and users may desire a typical beaded work surface.

The tailgate cover 110 may be detachable from the inner portion 108. The cover 110 may include at least one panel configured to cover at least a portion of the inner portion 108. The cover 110 may include a lip 112 configured to extend over a top portion 114 of the tailgate assembly 100. The cover 110 may be attached to the inner portion 108 via an attachment mechanism (not shown in FIG. 1).

The tailgate cover 110 may include one or more panels. By way of example, the tailgate cover 110 may include a first panel 116 and a second panel 118. The first and second panels 116, 118 may form the cover 110 when the panels 116, 118 are in an attached state with one another.

Figure 2A:
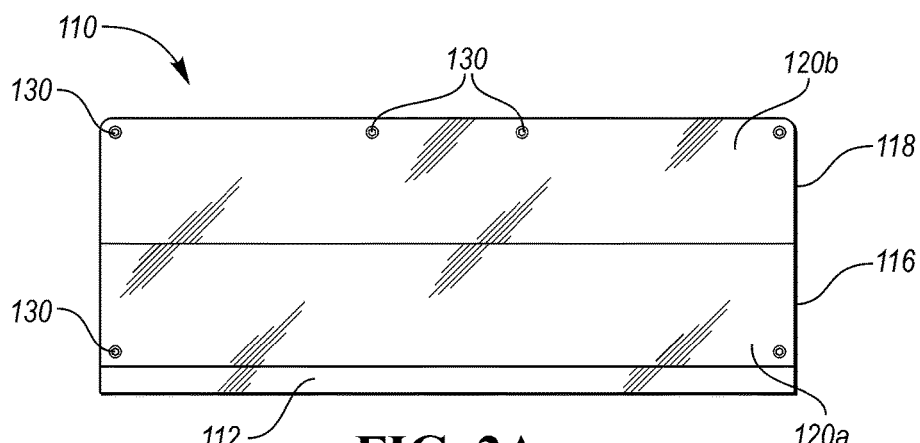
FIG. 2A illustrates an example flat side of the tailgate cover.
Figure 2B:
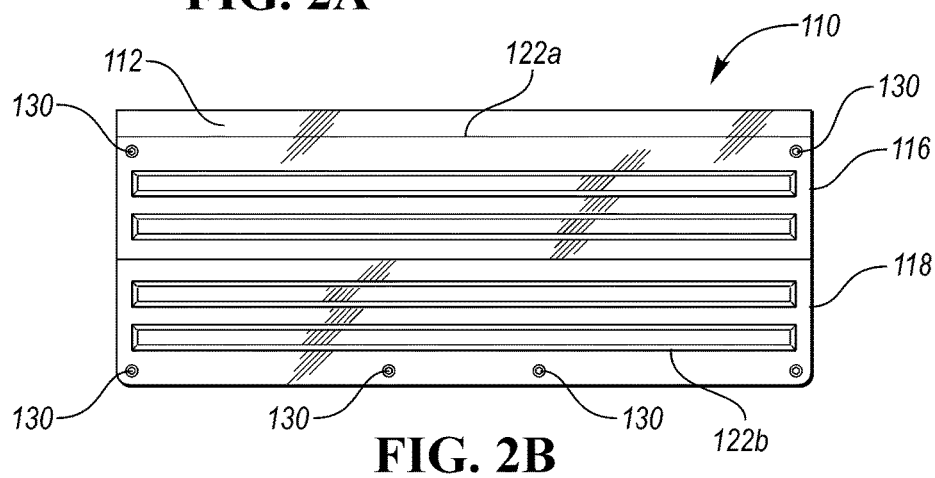
FIG. 2B illustrates an example beaded side of the tailgate cover.

Referring to FIG. 2A, the tailgate cover 110 may include a first side, or flat side 120. Referring to FIG. 2B, the tailgate cover 110 may include a second side, or beaded side 122. Each panel 116, 118 may have a beaded side and a flat side and form the flat side 120 and the beaded side 122 of the cover 110. For example, the first panel 116 may have a flat side 120a, as shown in FIG. 2A, and a beaded side 122a, as shown in FIG. 2B. Similarly, the second panel 118 may have a flat side 120b, as shown in FIG. 2A, and a beaded side 122b, as shown in FIG. 2B. When the panels 116, 118 are in an attached state such that the flat side 120a of the first panel aligns with the flat side 120b of the second panel (and subsequently aligning the beaded sides 122a, 122b), the panels 116, 118 may form a cover with the flat side 120 and the beaded side 122.

The tailgate cover 110 may be reversible between the flat side 120 and the beaded side 122 such that a user may alter the surface of the tailgate cover 110 to his or her preference. For example, as shown in FIG. 2A, the tailgate cover 110 may have the flat side 120 exposed when the user is using the tailgate assembly 100 to set plans on, rests drinks, etc. The beaded side 122, as shown in FIG. 2B, may be exposed, however, when the user is hauling heavy items.

The tailgate cover 110 may also form a partially beaded and partially flat side. This configuration is discussed below with respect to FIG. 5 and may occur when the beaded side of one of the panels 116, 118 is aligned with the flat side of the other panel 116, 118. That is, the beaded side 122a of the first panel 116 may align with the flat side 120b of the second panel. This may be beneficial when a user desires at least some portion of flat surface to set items on such as drinks, notes, mobile devices etc., but otherwise would rather have the stability that a beaded surface would provide.

The tailgate cover 110 may define a plurality of openings 130 configured to receive an attachment mechanism (not shown) such as a bolt or screw. The bolt or screw may be countersunk to prevent ingress/egress issues and provide for a more continual appearance of the cover 110. The openings 130 may be spaced around a periphery of the tailgate cover 110 and may attach to the inner portion 108 of the door 102. The bolts or screws may be easily and selectively installed so as to allow the cover 110 to be removed and reinstalled easily. Thus, when the needs of the user change, the surface of the cover 110 may be detached and reconfigured to a new arrangement.

The tailgate cover 110 may be made from various materials. In one example, the panels of the cover may be made from sheet metal such as extruded aluminum. In another example, the panels may be made of plastic, including hard plastics and polypropylene. Other materials, or combination of materials, may be used as well.

FIG. 3 illustrates a side view of the tailgate cover 110. As explained, the tailgate cover 110 may include the first panel 116 and the second panel 118. The first panel 116 and second panel 118 may be attached to one another via an attachment mechanism 128. The attachment mechanism 128 may fix the two panels 116, 118 together.

The first panel 116 may include a first ledge 132 extending from a first edge 138 of the first panel 116. The second panel 118 may have a second ledge 134 extending from a first edge 140 of the second panel 118. The first edge 140 of the second panel 118 may be proximate to the first edge 138 of the first panel 116 and the second ledge 134 is configured to align over the first ledge 132.

In an attached state, the first and second ledges 132, 134 may overlap one another such that the flat side 120a, 120b of each of the panels 116, 118 align with one another to form a flat side 120. A stud 126, or fastener, such as a screw or bolt, may be inserted at the second ledge 134 and extend through the first ledge 132 to maintain engagement of the first ledge 132 with the second ledge 134.

FIG. 4 illustrates a side view of the tailgate cover 110 having another attachment mechanism 128. The first panel 116 may include a projection 150 at the first edge 138 of the first panel 116. The projection may extend outward from the edge 138. The second panel 118 may define a groove 152 at the first edge 140 of the second panel 118. The groove 152 may be configured to receive the projection 150 to secure the first panel 116 to the second panel 118. The attachment mechanism 128 may include the stud 126 which may extend through the groove 152 and projection 152 to secure the projection 152 within the groove 152. In an attached state, the flat side 120a, 120b of each of the panels 116, 118 may align with one another to form a flat side 120.

In both the examples shown in FIGS. 3 and 4, the attachment mechanism 128 may maintain the first panel 116 in an attached state with the second panel 118 so as to permit the panels 116, 118 to form the cover 110. The cover 110 may then be customized such that either the flat side 120 or the beaded side 122 is exposed with the opposite side abutting the inner portion 108 of the tailgate assembly 100. That is, once the panels 116, 118 are attached to one another, the cover 110 may be flipped and attached to the inner portion 108.

FIG. 5 illustrates an example where the panels 116, 118 are attached to form partially flat and beaded surfaces. In this example, the flat side 120a of the first panel 116 aligns with the beaded side 122b of the second panel 118. Conversely, the beaded side 122a of the first panel 116 aligns with the flat side 120b of the second panel 118. The cover 110 then forms a partially flat and beaded surface. This may be beneficial when the user is using a truck bed to hull heavy materials, but still wishes to have a flat surface for writing, resting items such as coffee, tablets, plans, etc.

In the example shown in FIG. 5, each of the panels 116, 118 may be flipped or orientated the opposite way. That is, the projection 150 and groove 152 arrangement may be operational when the flat sides 120a, 120b align, as well as when one of the flat sides 120a, 120b align with one of the beaded sides 122a, 122b.

Accordingly, a flexible, customizable work surface may be facilitated using the tailgate cover. A completely flat surface may be exposed when the cover is attached to the tailgate. The beaded side may also be exposed, depending on the user's desires. A partially flat and beaded surface may also be facilitated by attaching the first panel and the second panel so as to align a flat surface with a beaded surface. The cover may be easily detached from the tailgate and reconfigured.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tailgate cover assembly, comprising:
a first panel having a beaded side and a flat side, and
a second panel having a beaded side and a flat side, the second panel configured to attach to the first panel wherein the flat side of one panel aligns with the beaded side of the other panel to form a tailgate cover having partially beaded and partially flat sides.

2. The assembly of claim 1, further comprising a fastener extending through each of the first panel and the second panel to secure the first panel to the second panel.

3. The assembly of claim 2, wherein the fastener is a screw or a bolt.

4. The assembly of claim 1, wherein the first panel and the second panel each define at least one opening configured to receive an attachment mechanism to fix the tailgate cover to an inner portion of a tailgate exposing the beaded side or the flat side of the tailgate cover.

5. A tailgate assembly, comprising:
a tailgate cover including a first panel and a second panel, the first panel including a projection and the second panel defining a groove configured to receive the projection to attach the first panel to the second panel, wherein each of the first panel and second panel include a beaded side and a flat side, the beaded side of one panel configured to align with the flat side of the other panel in the attached state to expose a flat portion and a beaded portion when the cover is fixed to the inner portion of the tailgate.

6. The assembly of claim 5, further comprising a fastener extending through each of the first panel and the second panel to secure the first panel to the second panel, wherein the fastener is a screw or a bolt.

7. The assembly of claim 5, wherein the first panel and the second panel each define at least one opening configured to receive an attachment mechanism to fix the tailgate cover to an inner portion of a tailgate.

8. The assembly of claim 5, wherein the first panel includes a ledge configured to extend over a top portion of the tailgate.

9. The assembly of claim 7, wherein the projection of the second panel is received by the groove of the first panel when the cover is in an attached state and further wherein the cover is configured to be fixed to an inner portion of a tailgate.

10. The assembly of claim 9, wherein each of the first panel and second panel include a beaded side and a flat side, the beaded side of the first panel configured to align with the beaded side of the second panel in the attached state, where one of a beaded side of the cover or a flat side of the cover is exposed when the cover is fixed to the inner portion of the tailgate.

11. A tailgate cover assembly, comprising:
a first panel having a beaded side and a flat side;
a second panel having a beaded side and a flat side, and
an attachment mechanism configured to selectively attach the first panel to the second panel to form a tailgate cover having a beaded side and a flat side, wherein the beaded side of the first panel aligns with the beaded side of the second panel in an attached state where one of a beaded side of the cover or a flat side of the cover is exposed when the cover is fixed to an inner portion of the tailgate.

12. The assembly of claim 11, wherein the attachment mechanism includes a first ledge extending from the first panel and a second ledge extending from the second panel wherein the first ledge overlaps the second ledge to align the first panel with the second panel.

13. The assembly of claim 12, wherein the attachment mechanism includes a stud configured to extend through each of the first ledge and second ledge to secure the first ledge with the second ledge.

14. The assembly of claim 11, wherein the attachment mechanism includes a projection arranged on the first panel and a groove arranged on the second panel and configured to receive the projection.

15. The assembly of claim 14, wherein the attachment mechanism includes a stud configured to extend through each of the projection and groove to secure the projection within the groove.

16. The assembly of claim 11, wherein the beaded side of the first panel aligns with the flat side of the second panel or vice-versa in an attached state to expose a flat portion and a beaded portion when the cover is fixed to an inner portion of a tailgate.

* * * * *